United States Patent Office 2,781,329
Patented Feb. 12, 1957

2,781,329

PROCESS FOR INHIBITING GELATION OF A SOLUTION CONTAINING POLYMERIZED ACRYLONITRILE

James V. Hewett, Camden, S. C., assignor to E. I. du Pont de Nemours and Company, Wilmington, Del., a corporation of Delaware No Drawing. Application March 19, 1953, Serial No. 343,510

3 Claims. (Cl. 260—32.6)

This invention relates to improving the stability of solutions of acrylonitrile polymers or solutions of copolymers predominantly of acrylonitrile. More particularly, this invention is directed to inhibiting gelation of solutions of polyacrylonitrile and copolymers composed of at least 85% polyacrylonitrile.

Acrylonitrile polymers and copolymers having at least 85% acrylonitrile are difficultly soluble. Even in N,N-dimethylformamide, one of the better known solvents, solution at satisfactory concentration levels for evaporative spinning is effected only at elevated temperatures, such as above 100° C. When such solution is maintained at elevated temperatures for a period of time, the solution viscosity increases, gradually at first and then more rapidly, until after a number of hours gelation of the solution takes place. Under normal operating conditions a 23% solution of polyacrylonitrile in N,N-dimethylformamide maintained at a temperature of 125° C. will increase in viscosity tenfold in about 60 hours and will set to a rigid gel within a few hours thereafter. This time at which the solution has increased in viscosity by a factor of 10 will hereinafter be referred to as the "gel time" of the solution.

The gelation at elevated temperatures of spinning solutions of polyacrylonitrile and of copolymers having at least 85% acrylonitrile is a very serious problem in the production of high quality filaments, fibers, yarns and the like. Deposits of gel are known to form on the walls of equipment and small pieces of gel that work loose from the walls or that form in stagnant areas cause non-uniformities in the spun structures and seriously affect subsequent drawing, as is evidenced by poor continuity of drawing and lowered quality in the fiber product produced. It is, therefore, extremely important that some way of increasing the gel time of spinning solutions be provided.

Accordingly, an object of this invention is to provide for the production of solutions having increased gel times. Another object is to improve the gel time of solutions of the stated acrylonitrile polymers. Other objects will be apparent from the description that follows.

After extensive research and testing, it was found that certain adjuvants would effectively inhibit gelation of the spinning solution. This invention accomplishes the desired result by providing a small amount of a soluble aldehyde compound, which is free of aliphatic unsaturation, in the solution of an acrylonitrile polymer containing at least 85% acrylonitrile. The aldehyde compounds may be saturated aliphatic aldehydes or aromatic aldehydes free of aliphatic unsaturation, such as, for example, formaldehyde or benzaldehyde or derivatives or compounds readily converted to aldehydes. The aldehydes may be added as such or may be formed in the solution from the addition thereto of an aldehyde-forming compound as will be explained more fully hereinafter.

A small amount of aldehyde may substantially increase the gel time of the solution and about 0.2% to 1.0%, based on the weight of the solution, is preferred, but in some instances as much as 2.5% aldehyde, by weight based on the solution, or 10% or more, based on the weight of polymer, may be used to good advantage.

Effective inhibition of gelation results from the addition of certain vinyl ether compounds to the polymer solution. It is believed that these compounds are effective through the formation of a saturated aliphatic aldehyde in situ. For example, 2-chloroethyl vinyl ether and 2-ethylhexyl vinyl ether and acetals of the aldehydes described herein are effective gelation inhibitors. The mechanism by which these compounds function appears to be due to this hydrolysis to acetaldehyde in the polymer solution.

The following examples are given to further illustrate this invention without any intention of being limited thereby. Parts and percentages given are by weight.

EXAMPLE I

A solution consisting of 22.9% polyacrylonitrile, 0.46% of n-hexaldehyde ($CH_3(CH_2)_4$—CHO) and 76.64% of N,N-dimethylformamide containing about 0.25% water, while maintained at a temperature of 125° C., reached its gel time in 98 hours. A control solution (23% polyacrylonitrile and 77% N,N-dimethylformamide containing about 0.25% water) under the same temperature conditions reached its gel time in about 60 hours.

EXAMPLE II

A solution consisting of 22.9% polyacrylonitrile, 0.46% of n-heptaldehyde ($CH_3(CH_2)_5$—CHO) and 76.64% of N,N-dimethylformamide containing about 0.25% water, while maintained at a temperature of 125° C., reached its gel time in 136 hours. Again, the control solution under the same temperature conditions reached its gel time in about 60 hours.

EXAMPLE III

A solution prepared from 22.95 parts of polyacrylonitrile, 0.23 part of formaldehyde (HCHO) and 76.32 parts of N,N-dimethylformamide containing about 0.25% water was held at a temperature of 125° C. for 104 hours before the solution viscosity had increased tenfold, the gel time of the solution, whereas a control solution heated under identical conditions reached its gel time in about 60 hours.

EXAMPLE IV

A solution prepared from 22.95 parts of polyacrylonitrile, 0.23 part of benzaldehyde ($C_6H_5CHO$) and 76.82 parts of N,N-dimethylformamide containing about 0.25% water, when maintained at a temperature of 125° C., reached its gel time in 98 hours, whereas a control solution under the same temperature conditions reached its gel time in about 60 hours.

EXAMPLE V

A solution prepared from 22.95 parts of polyacrylonitrile, 0.23 part of 2-chloroethyl vinyl ether ($H_2C=CHOC_2H_4Cl$) and 76.82 parts of N,N-dimethylformamide containing about 0.25% water, while held at a temperature of 125° C., reached its gel time in 141 hours while the control solution reached its gel time in about 60 hours.

EXAMPLE VI

The copolymers listed below in Table I were prepared to contain from about 4% to 10% copolymerizing material and the balance acrylonitrile. These copolymers were separately dissolved in N,N-dimethylformamide containing about 0.25% water to form 23% solutions of the copolymer and the gel time was determined while maintaining the solution at 125° C. The results "gel time in hours" are contained in Table I below. Similar solutions containing 23% of copolymer, 0.5% of formaldehyde and 76.5% of dimethylformamide containing about 0.25% water, when maintained at 125° C., did not increase as much as tenfold in viscosity within 100 hours.

Table I

| Copolymer: | Gel time in hours control |
|---|---|
| Acrylonitrile/methylacrylate | 59 |
| Acrylonitrile/2-vinyl pyridine/vinyl acetate | 31 |
| Acrylonitrile/N-tertiary octyl acrylamide | 47 |
| Acrylonitrile/2-butoxyethyl methacrylate | 44 |

Similar results are obtained when the above experiments are repeated using, instead of N,N-dimethylformamide, such materials as tetramethylene cyclic sulfone or ethylene cyclic carbonate as the solvent.

EXAMPLE VII 23 parts of acrylonitrile polymer was dissolved in 77 parts of N,N-dimethyl acetamide, and the resultant solution was maintained at a temperature of 125° C. for 150 hours after which time the solution viscosity had increased tenfold. A similar solution containing 23% acrylonitrile polymer, 76.5% N,N-dimethyl acetamide and 0.5% formaldehyde after being heated at 125° C. for 200 hours was still fluid and its viscosity had not increased as much as tenfold.

In addition to the aldehydes above-mentioned, other saturated aliphatic aldehydes, such as acetaldehyde, the various straight or branched chain aldehydes corresponding to propionaldehyde, butyraldehyde, valeraldehyde, nonaldehyde, and similar aldehydes may be used in the practice of this invention. Also, other aromatic aldehydes free of aliphatic unsaturation, such as tolualdehyde, salicylaldehyde, and the like and even the aldehydes of higher molecular weights provided they are soluble in the solution may be used to advantage in carrying out this invention.

The invention has been described primarily with respect to N,N-dimethylformamide solutions of polyacrylonitrile, and gelation inhibition in such solutions is most desired, since N,N-dimethylformamide is a preferred solvent. However, numerous other solutions involving other solvents may be improved in gel time by the practice of this invention. The solutions disclosed in U. S. Patent 2,404,714 to 2,404,727 will be benefited by the practice of this invention as well as N,N-dimethylacetamide solutions of acrylonitrile polymers and of copolymers containing at least 85% acrylonitrile. The invention is applicable not only to the homopolymer and the specific copolymers above-mentioned but to many other copolymers, such as those mentioned in U. S. Patent 2,436,926, and, as shown above, the copolymer may contain more than two components, as, for further example, acrylonitrile/vinyl pyridine/methyl acrylate copolymers.

In the shaping of articles, the solutions contain an amount of polymer dependent in part upon the article to be formed. Generally, the solutions contain about 5% to about 40% polymer, by weight, though higher or lower amounts can be used. Preferably in fiber formation the solutions contain about 10% to about 35% of the polymer. In the specific examples given above the solutions contained a small amount of water. In such small amounts water can be tolerated; a small amount of water is generally present in the solvent. While the aldehyde compounds are more effective in the absence of water, the small amounts of water normally encountered do not affect their activity appreciably.

By the practice of this invention the length of time that solutions of acrylonitrile polymers can be held in tanks, pipe lines, or other equipment prior to spinning or otherwise shaping into products is greatly increased. Moreover, when the hold-up time is not changed, the character of the solution modified in accordance with this invention is so much improved that gel deposit on the walls of the containers is substantially eliminated. As a consequence, gel particles are not picked up in the flowing stream to produce heterogeneity in the fibers or other structures initially formed. Further, breaks and irregularities in subsequent drawing of these fibers is greatly reduced. Furthermore, the drawn filamentary products produced from these improved solutions are more uniform in physical and dyeing properties.

Any departure which conforms to the principles of this invention is intended to be included within the scope of the claims below.

I claim:

1. A process for inhibiting gelation at a temperature of at least 100° C. of a solution of a polymer formed from acrylonitrile and at least one monomer selected from the group consisting of methylacrylate, 2-vinyl pyridine, vinyl acetate, N-tertiary octyl acrylamide, and 2-butoxyethyl methacrylate, and containing in the polymer molecule at least 85% acrylonitrile, in a solvent selected from the group consisting of N,N-dimethylformamide, N,N-dimethyl acetamide, tetramethylene cyclic sulfone, and ethylene cyclic carbonate, which comprises incorporating into said solution between about 0.2% and about 2.5% formaldehyde based on the weight of said solution.

2. A process for inhibiting gelation at a temperature of at least 100° C. of a solution of a polymer formed from acrylonitrile and at least one monomer selected from the group consisting of methylacrylate, 2-vinyl pyridine, vinyl acetate, N-tertiary octyl acrylamide, and 2-butoxyethyl methacrylate, and containing in the polymer molecule at least 85% acrylonitrile, in N,N-dimethylformamide, which comprises incorporating into said solution between about 0.2% and about 2.5% formaldehyde based on the weight of said solution.

3. A process for inhibiting gelation at a temperature of at least 100° C. of a solution of polyacrylonitrile, in which the polymer is present in an amount between about 5% and about 40% by weight, in N,N-dimethylformamide, which comprises incorporating into said solution between about 0.2% and about 2.5% formaldehyde based on the weight of said solution.

References Cited in the file of this patent

UNITED STATES PATENTS

| 2,310,961 | Kropa | Feb. 16, 1943 |
| 2,549,913 | Lytton | Apr. 24, 1951 |
| 2,624,722 | Kropa | Jan. 6, 1953 |
| 2,671,089 | Mosse | Mar. 2, 1954 |
| 2,688,608 | Weinstock | Sept. 7, 1954 |